United States Patent
Merino Vazquez et al.

(10) Patent No.: US 12,133,151 B2
(45) Date of Patent: Oct. 29, 2024

(54) METHOD AND APPARATUS FOR MANAGING ONE OR MORE GROUPS OF MACHINE-TYPE COMMUNICATION (MTC) DEVICES IN A CELLULAR NETWORK

(71) Applicant: Telefonaktiebolaget LM Ericsson (publ), Stockholm (SE)

(72) Inventors: Emiliano Merino Vazquez, Madrid (ES); Hao Zou, Shanghai (CN); Jingrui Tao, Guangzhou (CN)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 480 days.

(21) Appl. No.: 17/421,823

(22) PCT Filed: Jan. 10, 2019

(86) PCT No.: PCT/CN2019/071077
§ 371 (c)(1),
(2) Date: Jul. 9, 2021

(87) PCT Pub. No.: WO2020/142970
PCT Pub. Date: Jul. 16, 2020

(65) Prior Publication Data
US 2022/0078593 A1 Mar. 10, 2022

(51) Int. Cl.
*H04W 4/70* (2018.01)
*H04W 4/08* (2009.01)

(52) U.S. Cl.
CPC .............. *H04W 4/70* (2018.02); *H04W 4/08* (2013.01)

(58) Field of Classification Search
CPC ................................ H04W 74/40; H04W 4/08
See application file for complete search history.

(56) References Cited

U.S. PATENT DOCUMENTS

2016/0007138 A1* 1/2016 Palanisamy ............ H04L 12/28
455/41.2

FOREIGN PATENT DOCUMENTS

CN 102238486 A 11/2011
WO 2011116603 A1 9/2011
(Continued)

OTHER PUBLICATIONS

International Search Report and Written Opinion dated Sep. 30, 2019 for International Patent Application No. PCT/CN2019/071077 filed Jan. 10, 2019, consisting of 6-pages.
(Continued)

*Primary Examiner* — Sulaiman Nooristany
(74) *Attorney, Agent, or Firm* — Weisberg I.P. Law, P.A.

(57) ABSTRACT

A method, apparatus and computer program product for managing one or more groups of Machine-Type Communication (MTC) devices in a cellular network. According to one aspect, a method for managing one or more groups of Machine-Type Communication (MTC) devices in a cellular network includes an exposure function for exposing network capabilities and events detected by other network functions, characterized by the following steps carried out at the exposure function: —a) receiving, from an MTC application, a request for membership management on the one or more MTC groups, wherein the request includes corresponding one or more MTC group identifiers and an MTC device identifier for the MTC application; and —b) transmitting, towards a user profile server, a corresponding request for membership management, wherein the corresponding request includes the one or more MTC group identifiers, the MTC device identifier and a corresponding MTC application identifier.

6 Claims, 6 Drawing Sheets

(56) References Cited

FOREIGN PATENT DOCUMENTS

| WO | 2012062077 A1 | 5/2012 |
| WO | 2015200801 A1 | 12/2015 |
| WO | 2016101429 A1 | 6/2016 |
| WO | 2016161242 A1 | 10/2016 |

OTHER PUBLICATIONS

EPO Communication with Supplementary European Search Report dated Nov. 21, 2023 for Patent Application No. 19908709.9, consisting of 9 pages.
3GPP TS 23.682 V16.0.0; 3rd Generation Partnership Project; Technical Specification Group Services and System Aspects; Architecture enhancements to facilitate communications with packet data networks and applications (Release 16); Sep. 2018, consisting of 126 pages.
3GPP TS 23.502 V15.3.0; 3rd Generation Partnership Project; Technical Specification Group Services and System Aspects; Procedures for the 5G System; Stage 2 (Release 15); Sep. 2018, consisting of 330 pages.

\* cited by examiner

METHOD AND APPARATUS FOR MANAGING ONE OR MORE GROUPS OF MACHINE-TYPE COMMUNICATION (MTC) DEVICES IN A CELLULAR NETWORK

CROSS-REFERENCE TO RELATED APPLICATIONS

This application is a Submission Under 35 U.S.C. § 371 for U.S. National Stage Patent Application of International Application Number: PCT/CN2019/071077, filed Jan. 10, 2019 entitled "METHOD AND APPARATUS FOR MANAGIN ONE OR MORE GROUPS OF MACHINE-TYPE COMMUNICATION (MTC) DEVICES IN CELLULAR NETWORK," the entirety of which is incorporated herein by reference.

TECHNICAL FIELD

The present invention generally relates to Cellular Internet of Things (CIoT). More particularly, the present invention relates to a method for managing one or more groups of Machine-Type Communication (MTC) devices in a cellular network. The present invention also relates to apparatus and computer program product adapted for the same purpose.

BACKGROUND

Machine-type communication (MTC) is a form of data communication which involves one or more entities that do not necessarily need human interaction. With the aid of Cellular Internet of Things (CIoT) technologies being standardized as part of 3GPP, a telecommunications operator may provide other parties/companies with MTC service for implementing a variety of applications.

One of the applications involves smart-metering where a group of metering readers are disposed widely and report data, e.g., electricity consumption amount, water-levels, to MTC server(s) on a regular basis. As another example, a car hiring company needs to schedule a large number of vehicles in real time. To this end, MTC devices are disposed on the vehicles so that the company may track each of the vehicles in operation. Moreover, the company may push interesting contents, via MTC communication, for passengers or drivers in their trips.

For one group of MTC devices, members therein may be in change. As an example, when smart metering service extends to new buildings/home, additional metering readers need to be added in an existing group. In some cases, e.g., the car hiring company, the change occurs frequently and in a massive scale. However, the current cellular network offers no mechanism for managing membership in a MTC group in an efficient and cost-effective way.

SUMMARY

According to one aspect of the present invention, a method for managing one or more groups of Machine-Type Communication (MTC) devices in a cellular network comprising an exposure function for exposing network capabilities and events detected by other network functions, be characterized by comprising the following steps carried out at the exposure function:
 a) receiving, from an MTC application, a request for membership management on the one or more MTC groups, wherein the request comprises corresponding one or more MTC group identifiers and an MTC device identifier for the MTC application; and
 b) transmitting, towards a user profile server, a corresponding request for membership management, wherein the corresponding request comprises the one or more MTC group identifiers, the MTC device identifier and a corresponding MTC application identifier.

According to another aspect of the present invention, a method for managing one or more groups of Machine-Type Communication (MTC) devices in a cellular network comprising a user profile server for handling subscription data and provisioning capability for the MTC devices, be characterized by comprising the following steps carried out at the user profile server:
 a) receiving, from an exposure function, a request for membership management on the one or more MTC groups by an MTC application, wherein the request comprises corresponding one or more MTC group identifiers, an MTC device identifier and a corresponding MTC application identifier; and
 b) transmitting, towards a provisioning gateway system, a corresponding request for membership management, wherein the corresponding request comprises the one or more MTC group identifiers and the MTC device identifier.

In one or more embodiments of the present invention, it provides MTC providers with an autonomous management capability, e.g., in 3GPP 4G/5G core network architecture. Through Exposure function (EF), an MTC provider could access to a provisioning function to manage membership for its MTC devices. The MTC provider may be authorized by a user profile server, e.g., Home Subscriber Server (HSS), Unified Database Management (UDM) or unified/User data Repository (UDR). Hence, the network function can be exposed to third party in a safe manner, since the EF will authenticate the MTC Application and the user profile server will check whether the MTC Application owns the MTC Group(s) and it is authorized to perform the requested membership management operation.

Moreover, the authorization may be restrictive on the application basis, MTC group basis or MTC provider basis so as to satisfy a variety of rules as required. It may also facilitate the monetization of network since IoT devices could be managed autonomously.

BRIEF DESCRIPTION OF THE DRAWINGS

The foregoing and other objects, features, and advantages of the invention would be apparent from the following more particular description of preferred embodiments as illustrated in the accompanying drawings in which.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term "processor" refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

As used herein, the term "Exposure Function (EF)" refers to a functional entity for exposing network capabilities and events detected, e.g., by other network functions. The non-exclusive examples of the EF include Service Capability Exposure Function (SCEF) as defined under 3GPP TS23.682 or Network Exposure Function (NEF) as defined under TS23.502. Both of these 3GPP Specifications are incorporated herein by reference in its entirety.

In one or more embodiments of the present invention, through the EF provided by a network, e.g., cellular network, third parties/companies may utilize network capabilities or functions to autonomously manage membership for their MTC devices connected to the network. As an illustrative example, the third parties/companies may configure the group by adding one or more MTC devices from the group, removing one or more MTC devices from the group, or moving one or more MTC devices between the group and other group(s) by using a provisioning function.

The management may be applied to individual MTC devices or a group of MTC devices. To this end, an MTC group identifier may be assigned to a group of MTC devices and an MTC device identifier may be assigned to each of the MTC devices therein. Furthermore, such identification mechanism is also applicable to an MTC provider.

In one or more embodiments of the present invention, a management process is initiated at the MTC provider side through an application. In the context of 3GPP 4G/5G core network architecture, a service REST API supported by the SCEF/NEF is offered to expose the provisioning function to the application. Preferably, before it is allowed to access to the provisioning function, the application shall be authenticated by the EF, e.g. SCEF/NEF, and authorized by a user profile server, e.g., Home Subscriber Server (HSS), Unified Database Management (UDM) or unified/User data Repository (UDR). Additionally, to distinguish a plurality of applications in use, each of them may be allocated to an MTC application identifier. The authorization may be restrictive on the application basis, MTC group basis or MTC provider basis so as to satisfy a variety of rules as required.

Figure 1:
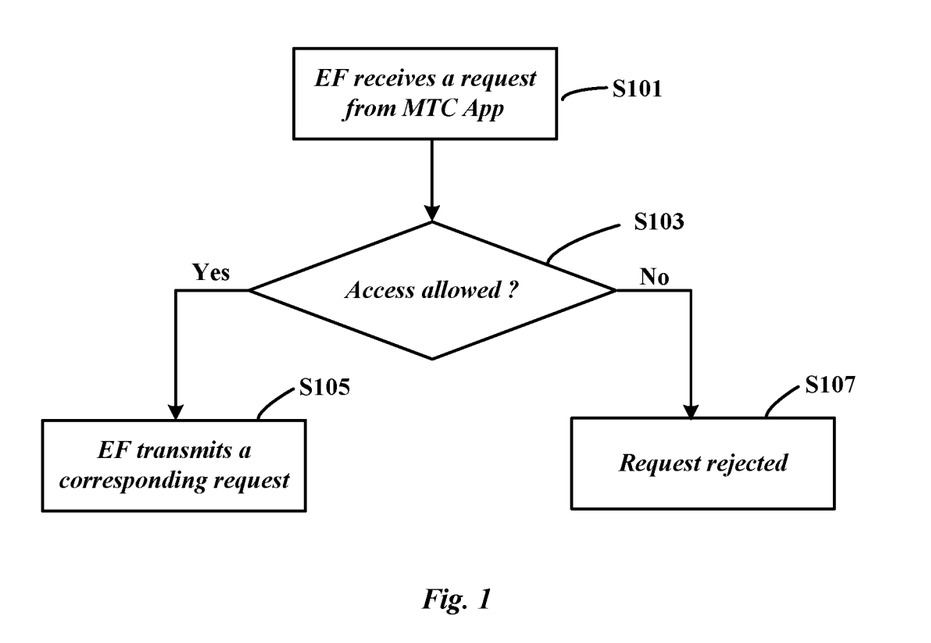
FIG. 1 is a flow diagram illustrating a process for managing one or more groups of Machine-Type Communication (MTC) devices, performed at EF side, according to one or more exemplary embodiment of the present invention.

FIG. 1 is a flow diagram illustrating a process for managing one or more groups of Machine-Type Communication (MTC) devices, performed at EF side, according to one or more exemplary embodiment of the present invention.

With reference to FIG. 1, at step S101, from an MTC application for membership management, an EF provided by the cellular network, e.g., SCEF and NEF, receives a request for membership management on one or more MTC groups. For illustrative purpose, the request may comprise one or more MTC group identifiers and an MTC device identifier for the device to be managed.

Then, optionally, the process proceeds to step S103, the EF determines whether the MTC application is allowed to access to the EF (i.e. the MTC Application is successfully authenticated). If it is allowable, the process proceeds to step S105; otherwise, the process proceeds to step S107. In one or more embodiments, those MTC applications with authentication credentials may be registered in a table, and thus at step S103, the EF can retrieve the table to determine the correct credentials of the MTC Application for the request.

At step S105, the EF transmits a corresponding request towards a user profile server, e.g., HSS UDM or UDR, which authorizes the MTC application, and upon succeeding in authorization (i.e. the MTC Application is the owner(s) of the group and the group management operation, e.g. add group member, is permitted), instructs a Provisioning Gateway System (PGS) to provision information concerning the MTC device as prescribed in the corresponding request. In one or more embodiments, besides the MTC group identifiers and MTC device identifier as described above, the corresponding request may further comprise an MTC application identifier for the MTC application.

On the other hand, at step S107, the EF returns to the MTC application a message indicating that the request is refused.

Figure 2:
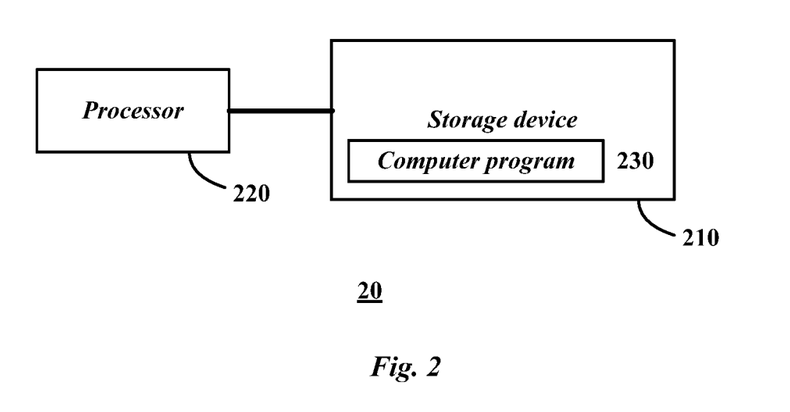
FIG. 2 is a block diagram illustrating an apparatus for managing one or more groups of Machine-Type Communication (MTC) devices in a cellular network according to one or more exemplary embodiment of the present invention.

FIG. 2 is a block diagram illustrating an apparatus for managing one or more groups of Machine-Type Communication (MTC) devices in a cellular network according to one or more exemplary embodiment of the present invention.

With reference to FIG. 2, the apparatus 20 comprises a storage device 210 and a processor 220 coupled to the storage device 210. The storage device 210 is configured to store a computer program 230 comprising computer instructions. The processor 220 is configured to execute the computer instructions to perform some or all of the method steps as shown in FIG. 1.

According to one or more embodiments of the present invention, it provides a computer program product for managing one or more groups of Machine-Type Communication (MTC) devices in a cellular network, the computer program product being embodied in a computer readable storage medium and comprising computer instructions to perform some or all of the method steps as shown in FIG. 1.

Figure 3:
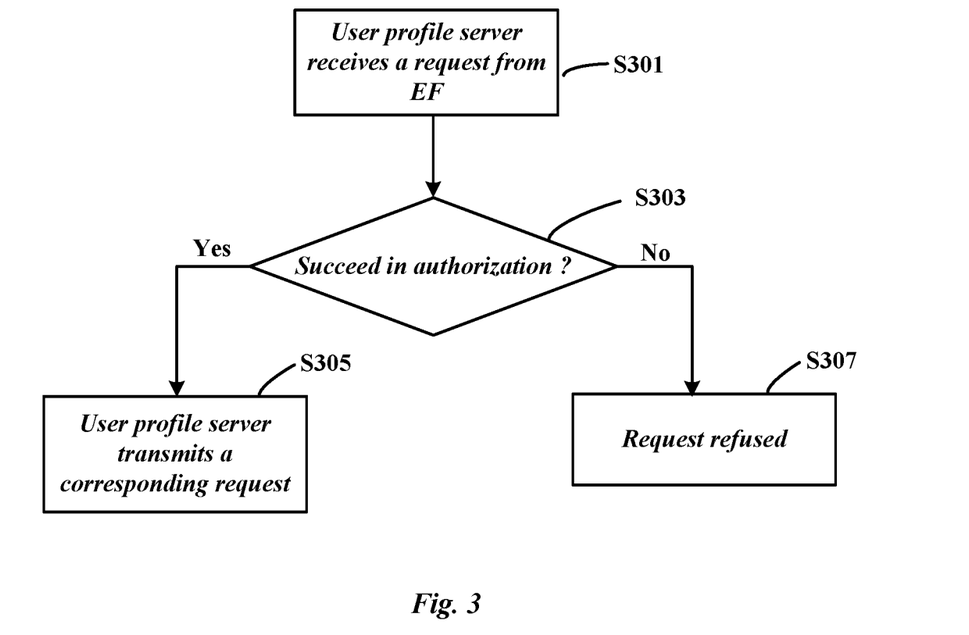
FIG. 3 is a flow diagram illustrating a process for managing one or more groups of Machine-Type Communication (MTC) devices, performed at user profile server side in a cellular network, according to one or more exemplary embodiment of the present invention.

FIG. 3 is a flow diagram illustrating a process for managing one or more groups of Machine-Type Communication (MTC) devices, performed at user profile server side in a cellular network, according to one or more exemplary embodiment of the present invention.

With reference to FIG. 3, at step S301, a user profile server for handling subscription data and provisioning capability receives, from an EF, e.g., SCEF and NEF, a request for membership management on one or more MTC groups by an MTC application. For illustrative purpose, the request comprises corresponding one or more MTC group identifiers, an MTC device identifier for a device to be managed and a corresponding MTC application identifier.

Then, optionally, the process proceeds to step S303, on the basis of subscription data associated with the MTC application or the MTC provider as the user of the MTC application, the user profile server determines whether an MTC application identified by the MTC application identifier is authorized to perform the requested operation(s). The examples of the requested operation(s) include but are not limited to the following: removing an MTC device from the one or more MTC groups, adding an MTC device into the one or more MTC groups, and moving an MTC device among the one or more MTC groups.

At step S303, if it succeeds in authorization, the process proceeds to step S305; otherwise, the process proceeds to step S307.

At step S305, the user profile server transmits a corresponding request for membership management towards a PGS, which in turn allows the MTC application to provision information concerning the MTC device(s) as prescribed in the corresponding request. In one or more embodiments, the corresponding request comprises the one or more MTC group identifiers and the MTC device identifier. Optionally, for an adding operation, prior to transmitting the corresponding request, the user profile server may generate, or be configured with, a pattern to derive an external identifier for the MTC device for the requested MTC group and then add the pattern in the corresponding request. In turn, the PGS generates the external identifier, on the basis of the given pattern, for the MTC device and associates the external identifier with the one or more MTC groups and, optionally, with a private identifier (IMSI or SUPI) from a locally configured pool of available IMSIs/SUPIs.

On the other hand, at step S307, the user profile server returns to the EF a message indicating that the request is refused.

Figure 4:
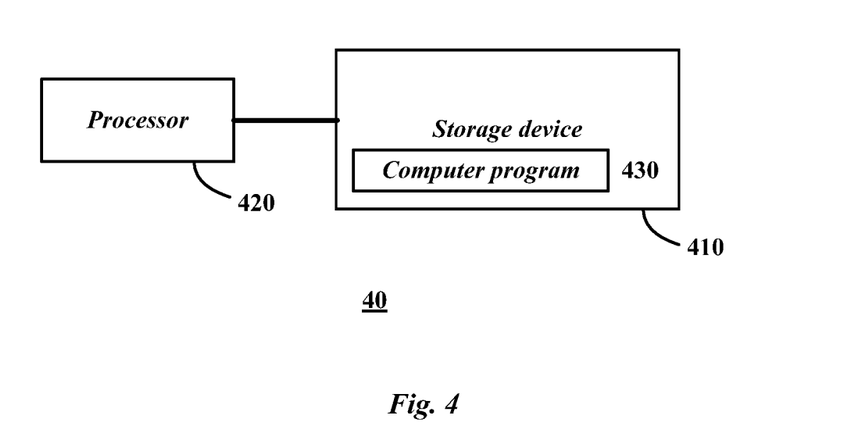
FIG. 4 is a block diagram illustrating an apparatus for managing one or more groups of Machine-Type Communication (MTC) devices in a cellular network according to one or more exemplary embodiment of the present invention.

FIG. 4 is a block diagram illustrating an apparatus for managing one or more groups of Machine-Type Communication (MTC) devices in a cellular network according to one or more exemplary embodiment of the present invention.

With reference to FIG. 4, the apparatus 40 comprises a storage device 410 and a processor 420 coupled to the storage device 410. The storage device 410 is configured to store a computer program 430 comprising computer instructions. The processor 420 is configured to execute the computer instructions to perform some or all of the method steps as shown in FIG. 3.

According to one or more embodiments of the present invention, it provides a computer program product for managing one or more groups of Machine-Type Communication (MTC) devices in a cellular network, the computer program product being embodied in a computer readable storage medium and comprising computer instructions to perform some or all of the method steps as shown in FIG. 3.

Figure 5:
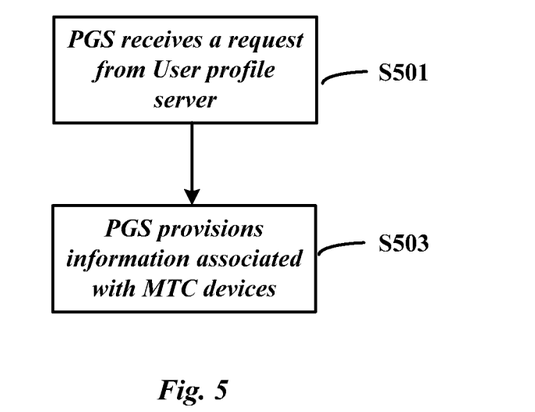
FIG. 5 is a flow diagram illustrating a process for managing one or more groups of Machine-Type Communication (MTC) devices, performed at provisioning gateway system side in a cellular network, according to one or more exemplary embodiment of the present invention.

FIG. 5 is a flow diagram illustrating a process for managing one or more groups of Machine-Type Communication (MTC) devices, performed at provisioning gateway system side in a cellular network, according to one or more exemplary embodiment of the present invention.

With reference to FIG. 5, at step S501, a PGS for performing provisioning capability receives, from a user profile server, e.g., HSS, UDM and UDR, a request for membership management on one or more MTC groups by an MTC application. For illustrative purpose, the request comprises corresponding one or more MTC group identifiers and an MTC device identifier for the MTC device to be managed.

Then, the process proceeds to step S503, the PGS provisions information associated with the MTC device to be managed as required by the request. In one ore more embodiment, the PGS may be deployed as a centralized system separate from the user profile server. Preferably, the PGS may be collocated with the user profile server.

Figure 6:
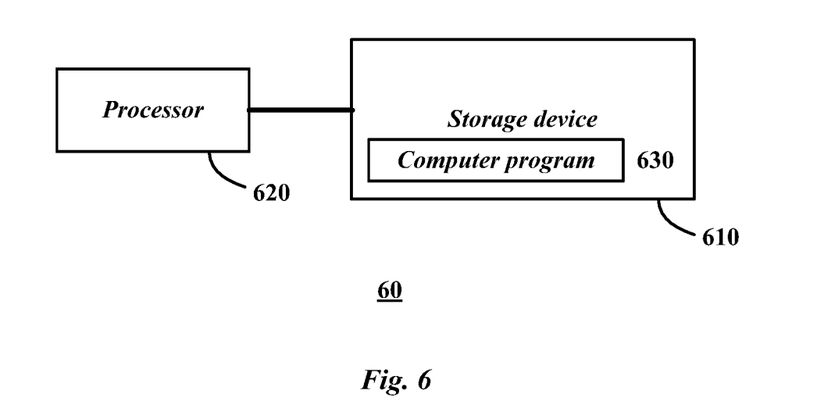
FIG. 6 is a block diagram illustrating an apparatus for managing one or more groups of Machine-Type Communication (MTC) devices in a cellular network according to one or more exemplary embodiment of the present invention.

FIG. 6 is a block diagram illustrating an apparatus for managing one or more groups of Machine-Type Communication (MTC) devices in a cellular network according to one or more exemplary embodiment of the present invention.

With reference to FIG. 6, the apparatus 60 comprises a storage device 610 and a processor 620 coupled to the storage device 610. The storage device 610 is configured to store a computer program 630 comprising computer instructions. The processor 620 is configured to execute the computer instructions to perform some or all of the method steps as shown in FIG. 5.

According to one or more embodiments of the present invention, it provides a computer program product for managing one or more groups of Machine-Type Communication (MTC) devices in a cellular network, the computer program product being embodied in a computer readable storage medium and comprising computer instructions to perform some or all of the method steps as shown in FIG. 5.

Figure 7:
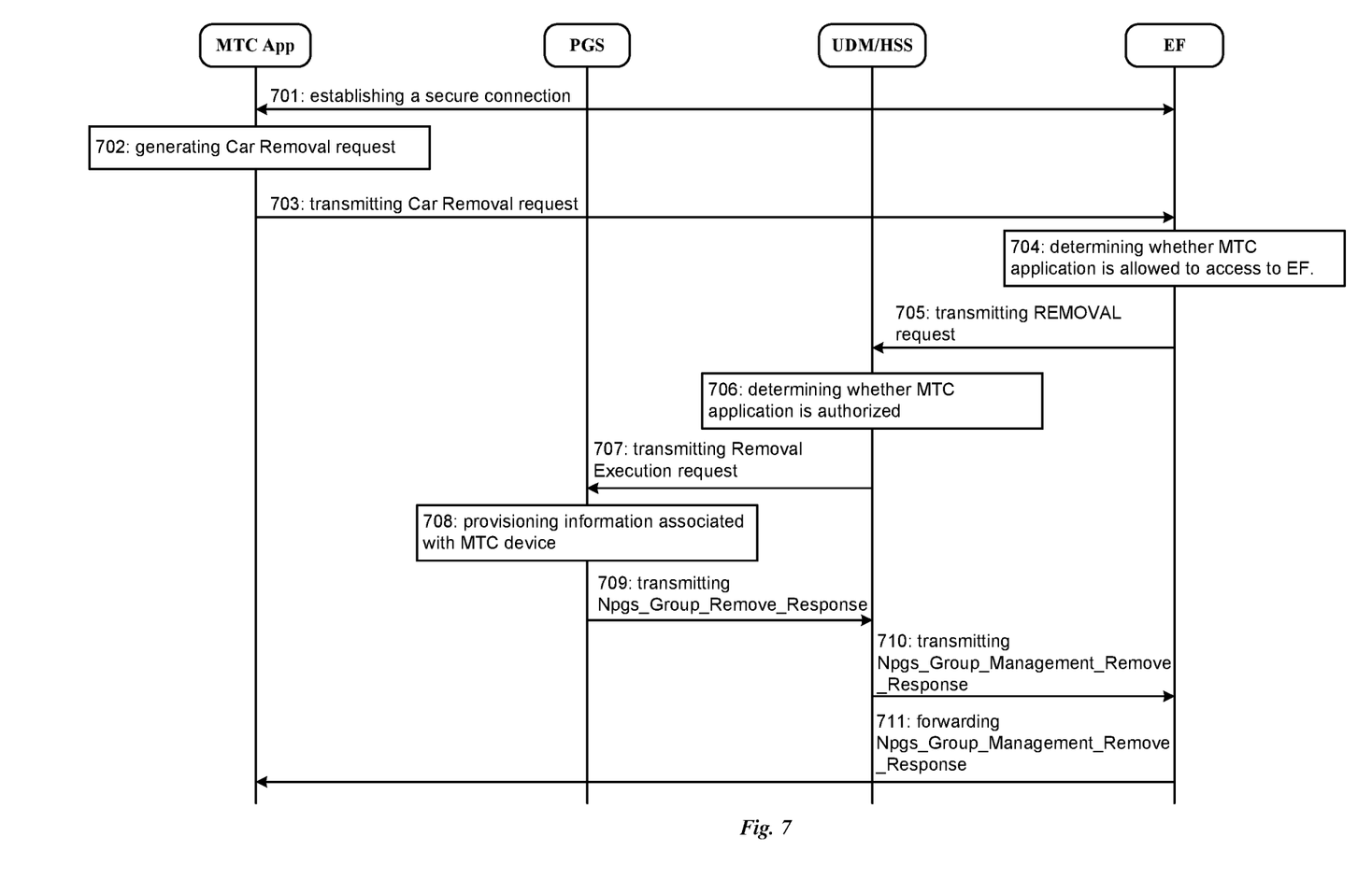
FIG. 7 shows Membership Removing procedure in a cellular network according to one or more exemplary embodiment of the present invention.

FIG. 7 shows Membership Removing procedure in a cellular network according to one or more exemplary embodiment of the present invention. For illustrative purpose, the procedure is described in the context of car management for a car hiring company "Europcar".

With reference to FIG. 7, at step 701, an MTC application establishes a secure connection with an EF, e.g., NEF/SCEF, in the cellular network by exchanging their respective credentials.

The procedure proceeds to step 702 where the MTC application generates a Car Removal request. Preferably, the request may indicate a type of operation to be performed and an object to be operated. As an example, the request may be represented as follows: "Nnef_Group_Management_Remove(Group ID=group-1@europcar.com, Individual ID=car-1@europcar.com)"

where "Nnef_Group_Management_Remove" indicates a car removal operation; the field "Individual ID" defines the car to be removed, e.g., car-1@europcar.com herein; "Group ID" defines the group from which the car to be removed, e.g., group-1@europcar.com herein.

At step 703, the MTC application transmits the Car Removal request to the EF via a service REST API.

At step 704, the EF determines whether the MTC application is allowed to access to the EF. If it is allowable, at step 705, the EF transmits to a use profile server, e.g., UDM or HSS, a REMOVAL request indicating that the car "car-1@europcar.com" needs to be removed from the group "group-1@europcar.com". Preferably, the REMOVAL request may indicate a type of operation to be performed and an object to be operated. As an example, the REMOVAL request may be represented as follows:

"Nnef_Group_Management_Remove(App ID=Europcar, Group ID=group-1@europcar.com, Individual ID=car-1@europcar.com)"

As compared to the Car Removal request, a field App ID for MTC application identity is newly added in the Removal request. In this example, the MTC Application is labeled as "Europcar".

Preferably, the App ID may be attached to or included in the credential from the MTC application at step 701.

The procedure then proceeds to step 706 where on the basis of subscription data associated with the MTC application identified as "Europcar", the UDM/HSS determines whether the MTC application is authorized to perform the car removal operation for the MTC Group identified by the Group ID, as requested. If succeeding in authorization, at step 707, the UDM/HSS transmits to a PGS a Removal Execution request. Preferably, the Removal Execution request may indicate a type of operation to be performed and an object to be operated. As an example, the request may be represented as follows:

"Npgs_Group_Remove(Group ID=group-1@europcar.com, Individual ID=car-1@europcar.com)"

where "Npgs_Group_Remove" indicates a Removal Execution request. Regarding the fields "Group ID" and "Individual ID", they are similar to those in the Car Removal request.

At step 708, in response to the Removal Execution request, the PGS provisions information associated with the car "car-1@europcar.com" or the MTC device installed thereon so as to remove the car from the MTC group "Group-1 @europcar.com".

At step 709, the PGS transmits to the UDM/HSS a Npgs_Group_Remove_Response indicating the removal operation succeeds. Then, at step 710, the UDM/HSS transmits to the EF a Npgs_Group_Management_Remove_Response indicating the removal operation succeeds. At step 711, the EF forwards to the MTC application the Npgs_Group_Management_Remove_Response.

Figure 8:
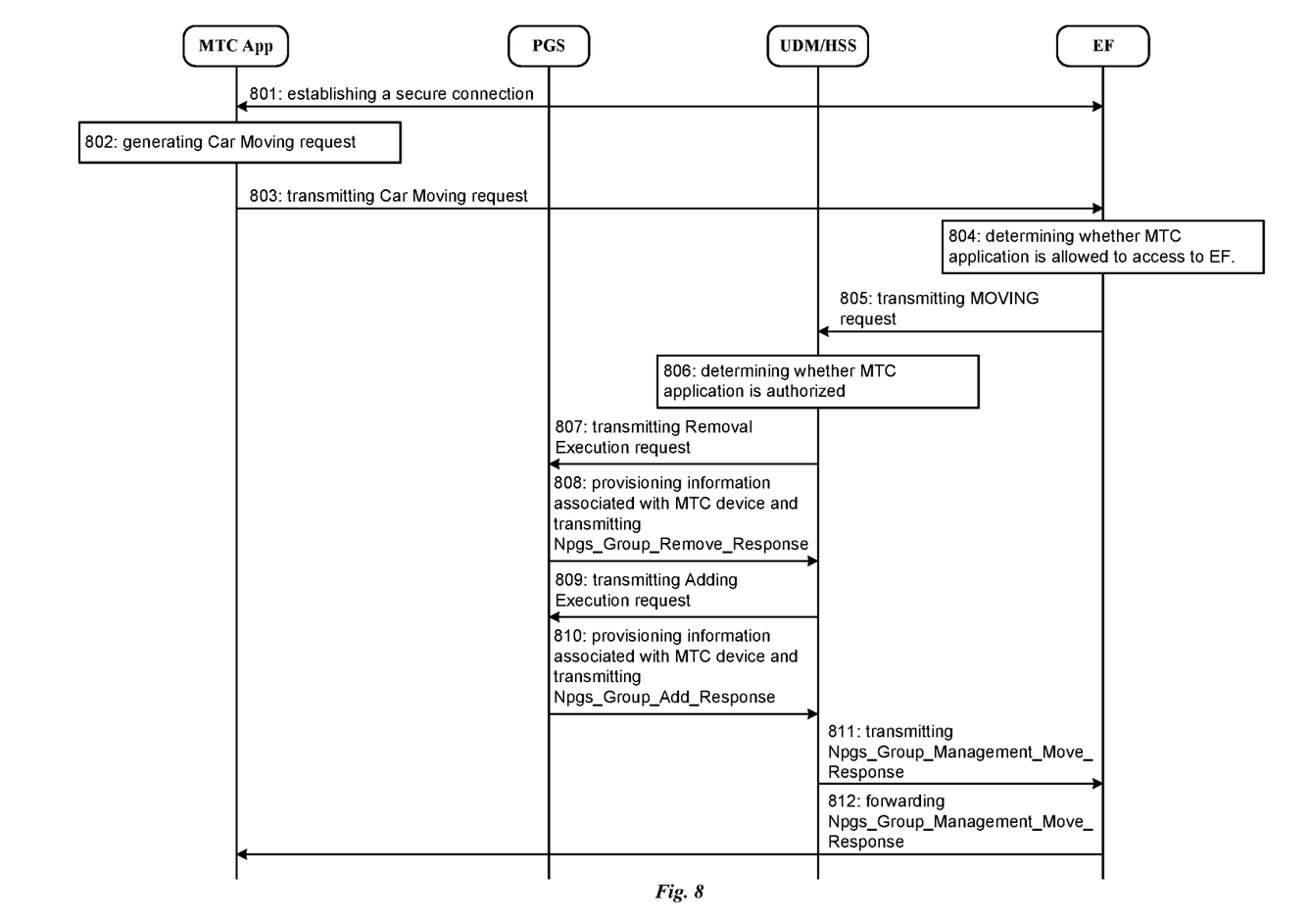
FIG. 8 shows Membership Moving procedure in a cellular network according to one or more exemplary embodiment of the present invention.

FIG. 8 shows Membership Moving procedure in a cellular network according to one or more exemplary embodiment of the present invention. For illustrative purpose, the procedure is described in the context of car management for a car hiring company "Europcar".

With reference to FIG. 8, at step 801, an MTC application establishes a secure connection with a NEF/SCEF, in the cellular network by exchanging their respective credentials.

The procedure proceeds to step 802 where the MTC application generates a Car Moving request to move an Individual ID from a source MTC Group to a destination MTC group. Preferably, the request may indicate a type of operation to be performed and an object to be operated. As an example, the request may be represented as follows:

"Nnef_Group_Management_Move(SrcGroup ID=group-1@europcar.com, DstGroup ID=group-2@europcar.com, Individual ID=car-2@europcar.com)"

where "Nnef_Group_Management_Move" indicates a car moving operation or a Car Moving request; "Individual ID" defines the car to be moved, "ScrGroup-1@europcar.com" defines the group from which the car is removed, and "DstGroup-1@europcar.com" defines the group into which the car is added.

At step 803, the MTC application transmits the Car Moving request to the EF via a service REST API.

At step 804, the EF determines whether the MTC application is allowed to access to the EF. If it is allowable, at step 805, the EF transmits to a use profile server, e.g., UDM or HSS, a MOVING request indicating that the car "car-2@europcar.com" needs to be moved from the group "group-1@europcar.com" into the group "group-2@europcar.com".

Preferably, the MOVING request may indicate a type of operation to be performed and an object to be operated. As an example, the MOVING request may be represented as follows:

"Nnef_Group_Management_Move(App ID=Europcar, SrcGroup ID=group-1@europcar.com, DstGroup ID=group-1@europcar.com, Individual ID=car-2@europcar.com)"

As compared to the Car Moving request, App ID for MTC application identity is newly added in the Moving request. In this example, the MTC Application is labeled as "Europcar". Preferably, the App ID may be attached to or included in the credential from the MTC application at step 801.

The procedure then proceeds to step 806 where on the basis of subscription data associated with the MTC application identified as "Europcar", the UDM/HSS determines whether the MTC application is authorized to perform the car moving operation for the indicated MTC Groups as requested. Alternatively, at step 806, upon succeeding in authorization, the UDM/HSS may further determine whether the addition of the car "car-2@europcar.com" would result in a circumstance where the number of the MTC devices in the destination group "group-2@europcar.com" exceeds an upper limit or quota. This quota may be configured in UDM/HSS per MTC Group and/or MTC Provider.

If succeeding in authorization, optionally, along with the number of the MTC devices not exceeding the upper limit, at step 807, the UDM/HSS transmits to a PGS a Removal Execution request. Preferably, the Removal Execution request may indicate a type of operation to be performed and an object to be operated. As an example, the request may be represented as follows:

"Npgs_Group_Remove(Group ID=group-1@europcar.com, Individual ID=car-2@europcar.com)"

where "Npgs_Group_Remove" indicates a car removal operation or a Removal Execution request, "Individual ID" defines the car to be removed, and "Group ID" defines the group from which the car is removed.

At step 808, in response to the Removal Execution request, the PGS provisions information associated with the car "car-2@europcar.com" or the MTC device installed thereon so as to remove the car from the MTC group "group-1@europcar.com", and transmits to the UDM/HSS a Npgs_Group_Remove_Response indicating the removal operation succeeds.

Then, the procedure proceeds to step 809 where upon receiving the Npgs_Group_Remove_Response indicating the removal operation succeeds, the UDM/HSS transmits to the PGS an Adding Execution request. Preferably, the Adding Execution request may indicate a type of operation to be performed and an object to be operated. As an example, the request may be represented as follows:
"Npgs_Group_Add (Group ID=group-2@europcar.com, Individual ID=car-2@europcar.com)"
where "Npgs_Group_Add" indicates a car removal operation or an Adding Execution request, "Individual ID" defines the car to be moved, and "Group ID" defines the group which the car is added into.

At step 810, in response to the Adding Execution request, the PGS provisions information associated with the car "car-2@europcar.com" or the MTC device installed thereon so as to add the car into the MTC group "group-2@europcar.com", and transmits to the UDM/HSS a Npgs_Group_Add_Response indicating the adding operation succeeds.

At step 811, the UDM/HSS transmits to the EF a Npgs_Group_Management_Move_Response indicating the moving operation succeeds. At step 812, the EF forwards to the MTC application the Npgs_Group_Management_Move_Response.

Figure 9:
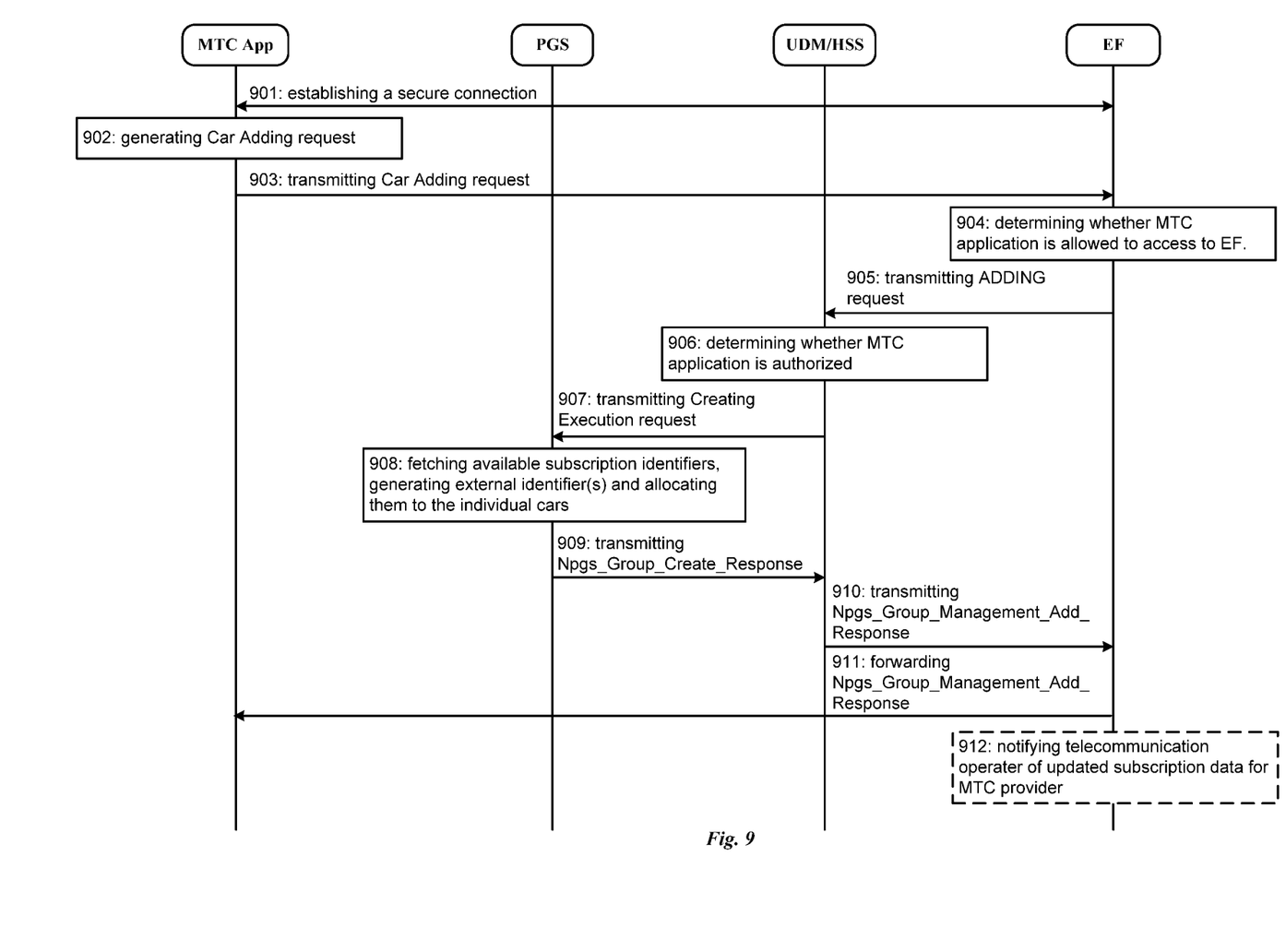
FIG. 9 shows Membership Adding procedure in a cellular network according to one or more exemplary embodiment of the present invention.

FIG. 9 shows Membership Adding procedure in a cellular network according to one or more exemplary embodiment of the present invention. For illustrative purpose, the procedure is described in the context of car management for a car hiring company "Europcar".

With reference to FIG. 9, at step 901, an MTC application establishes a secure connection with a NEF/SCEF, in the cellular network by exchanging their respective credentials.

The procedure proceeds to step 902 where the MTC application generates a Car Adding request. Preferably, the request may have a two-part structure, where one indicates a type of operation to be performed and the other indicates an object to be operated. As an example, the request may be represented as follows:
"Nnef_Group_Management_Add(Group ID=group-1@europcar.com, Number of Individual IDs=1)"
where "Nnef_Group_Management_Add" indicates a car adding operation or a Car Adding request, "Group ID" defines the group into which the car(s) are added. "Number of Individual IDs" defines the number of car(s) to be added into the group.

At step 903, the MTC application transmits the Car Adding request to the EF via a service REST API.

At step 904, the EF determines whether the MTC application is allowed to access to the EF. If it is allowable, at step 905, the EF transmits to a use profile server, e.g., UDM or HSS, an ADDING request indicating the group "Group-1@europcar.com" which the adding operation is directed on and the number of the added car(s). Preferably, the ADDING request may indicate a type of operation to be performed and an object to be operated. As an example, the ADDING request may be represented as follows:
"Nnef_Group_Management_Add(App ID=Europcar, Group ID=group-1@europcar.com, Number of Individual IDs=1)"

The procedure then proceeds to step 906 where on the basis of subscription data associated with the MTC application identified as "Europcar", the UDM/HSS determines whether the MTC application is authorized to perform the car adding operation for the indicated MTC Group as requested.

Alternatively, at step 906, upon succeeding in authorization, the UDM/HSS may further determine whether the addition of the car(s) would result in a circumstance where the number of the MTC devices in the destination group "group-1@europcar.com" exceeds an upper limit or quota. This quota may be configured in UDM/HSS per MTC Group and/or MTC Provider.

Alternatively, at step 906, the UDM/HSS may generate, or be configured with a pattern for deriving an external identifier for the MTC device(s) added into "group-1@europcar.com". In particular, the pattern may define the format of the external identifier. Preferably, the UDM/HSS may ensure that each of MTC providers is assigned to a unique pattern.

One exemplary format is given as follows:
"local_identifier@domain.com".

If succeeding in authorization, optionally, along with the number of the MTC devices not exceeding the upper limit, at step 907, the UDM/HSS transmits to a PGS a Creating Execution request. Preferably, the Creating Execution request may comprise a first part for indicating a type of operation to be performed and a second part for indicating an object to be operated. Optionally, the request may further comprise a third part for indicating the pattern defining the format of the external identifier.

As an example, the Creating Execution request may be represented as follows:
"Npgs_Group_Create (Group ID=group-1@europcar.com, Number of Individual IDs=1, Local ID pattern=^car-.+$, Domain=europcar)",
where "Npgs_Group_Create" indicates a Creating Execution request, "Group ID" defines the group in which the car is created, "Number of Individual IDs" defines the number of car(s) to be added into the group, "Local ID pattern" defines the format of the external identifier, and "Domain" defines an MTC provider.

Then, the procedure proceeds to step 908 where in response to the Creating Execution request, the PGS fetches available subscription identifiers, e.g., SUPI(s)/IMSI(s), for the car(s) to be created. Optionally, the PGS may generate one or more external identifier(s) according to the pattern in the Creating Execution request and allocate them to the individual cars to be added in the group "group-1". Preferably, the PGS may ensure that each of MTC devices or cars is assigned to a unique external identifier. To this end, a timestamp may be included in the external identifier.

At step 909, the PGS transmits to the UDM/HSS a Npgs_Group_Create_Response indicating the creating operation succeeds. Preferably, the external identifier(s) as generated at step 908 are included in the Npgs_Group_Create_Response or transmitted along with the Npgs_Group_Create_Response.

At step 910, the UDM/HSS transmits to the EF a Npgs_Group_Management_Add_Response indicating the adding operation succeeds. Preferably, the external identifier(s) as generated at step 908 are included in the Npgs_Group_Management_Add_Response or transmitted along with the Npgs_Group_Management_Add_Response.

At step 911, the EF forwards to the MTC application the Npgs_Group_Management_Add_Response.

Optionally, at step 912, the EF notifies a telecommunication operator of updated subscription data for the MTC provider "Europcar".

It should be noted that the aforesaid embodiments are illustrative of this invention instead of restricting this invention, substitute embodiments may be designed by those skilled in the art without departing from the scope of the claims enclosed. The wordings such as "include", "including", "comprise" and "comprising" do not exclude elements or steps which are present but not listed in the description and the claims. It also shall be noted that as used herein and in the appended claims, the singular forms "a", "an", and "the" may include plural referents unless the context clearly dictates otherwise. This invention can be achieved by means of hardware including several different elements or by means of a suitably programmed computer. In the unit claims that list several means, several ones among these means can be specifically embodied in the same hardware item. The use of such words as first, second, third does not represent any order, which can be simply explained as names. While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It will be obvious to a person skilled in the art that, as the technology advances, the inventive concept can be implemented in various ways. The above described embodiments are given for describing rather than limiting the disclosure, and it is to be understood that modifications and variations may be resorted to without departing from the scope of the disclosure as those skilled in the art readily understand. Such modifications and variations are considered to be within the scope of the disclosure and the appended claims. The protection scope of the disclosure is defined by the accompanying claims.

The invention claimed is:

1. A method for managing one or more groups of Machine-Type Communication (MTC) devices in a cellular network comprising a user profile server for handling subscription data and provisioning capability for the MTC devices, the method comprising, at the user profile server:
    receiving, from an exposure function, a request for membership management on the one or more MTC groups by an MTC application, the request including one or more corresponding MTC group identifiers, an MTC device identifier and a corresponding MTC application identifier;
    transmitting, towards a provisioning gateway system, a corresponding request for membership management, the corresponding request including the one or more MTC group identifiers and the MTC device identifier;
    in response to the request for membership management on the one or more MTC groups, determining, on the basis of subscription data, that an MTC application identified by the MTC application identifier is authorized to perform the requested operation prior to transmitting the corresponding request for membership management towards the provisioning gateway system; and
    upon determining that the MTC application is authorized to perform an adding operation, generating a pattern to derive an external identifier for the MTC device and instructing the provisioning gateway system to derive the external identifier, on the basis of the given pattern, for the MTC device and associate the external identifier with the one or more MTC groups, the user profile server being selected from a group comprising a Home Subscriber Server (HSS), a Unified Database Management (UDM), and a Unified/User Data Repository (UDR).

2. The method according to claim 1, wherein the membership management comprises at least one of the following operations: removing an MTC device from the one or more MTC groups, adding an MTC device into the one or more MTC groups, and moving an MTC device among the one or more MTC groups.

3. The method according to claim 1, wherein the exposure function is implemented by one of a Service Capability Exposure function (SCEF) and a Network Exposure Function (NEF).

4. An apparatus for managing one or more groups of Machine-Type Communication (MTC) devices in a cellular network, the apparatus being configured to handle subscription data and provisioning capability for the MTC devices, the apparatus comprising:
    a storage device configured to store a computer program comprising computer instructions; and
    a processor coupled to the storage device and configured to execute the computer instructions to:
    receive, from an exposure function, a request for membership management on the one or more MTC groups by an MTC application, the request including one or more corresponding MTC group identifiers, an MTC device identifier and a corresponding MTC application identifier;
    transmit, towards a provisioning gateway system, a corresponding request for membership management, the corresponding request including the one or more MTC group identifiers and the MTC device identifier;
    in response to the request for membership management on the one or more MTC groups, determine, on the basis of subscription data, that an MTC application identified by the MTC application identifier is authorized to perform the requested operation prior to transmitting the corresponding request for membership management towards the provisioning gateway system; and
    upon determining that the MTC application is authorized to perform an adding operation, generate a pattern to derive an external identifier for the MTC device and instruct the provisioning gateway system to derive the external identifier, on the basis of the given pattern, for the MTC device and associate the external identifier with the one or more MTC groups, the apparatus being selected from a group comprising a Home Subscriber Server (HSS), a Unified Database Management (UDM), and a Unified/User Data Repository (UDR).

5. The apparatus according to claim 4, wherein the membership management comprises at least one of the following operations: removing an MTC device from the one or more MTC groups, adding an MTC device into the one or more MTC groups, and moving an MTC device among the one or more MTC groups.

6. The apparatus according to claim 4, wherein the exposure function is implemented by one of a Service Capability Exposure function (SCEF) and a Network Exposure Function (NEF).

* * * * *